US008181109B2

(12) United States Patent  
Atkin et al.

(10) Patent No.: US 8,181,109 B2  
(45) Date of Patent: May 15, 2012

(54) ENABLING UNICODE INPUT IN LEGACY OPERATING SYSTEMS

(75) Inventors: Steven Edward Atkin, Austin, TX (US); Kenneth Wayne Borgendale, Austin, TX (US); Michael Aaron Kaply, Austin, TX (US); Baldev Singh Soor, Markham (CA)

(73) Assignee: International Business Machines Corporation, Armonk, NY (US)

( * ) Notice: Subject to any disclaimer, the term of this patent is extended or adjusted under 35 U.S.C. 154(b) by 2119 days.

(21) Appl. No.: 10/388,096

(22) Filed: Mar. 13, 2003

(65) Prior Publication Data

US 2004/0181776 A1  Sep. 16, 2004

(51) Int. Cl.
*G06F 17/00* (2006.01)
(52) U.S. Cl. ........................................ 715/264; 715/200
(58) Field of Classification Search ...... 704/8; 345/168; 715/536, 264, 200; 717/111; 707/111
See application file for complete search history.

(56) References Cited

U.S. PATENT DOCUMENTS

| | | | | |
|---|---|---|---|---|
| 5,523,754 | A * | 6/1996 | Eisen et al. | 341/20 |
| 5,793,381 | A * | 8/1998 | Edberg et al. | 345/467 |
| 5,946,499 | A * | 8/1999 | Saunders | 710/73 |
| 5,964,839 | A * | 10/1999 | Johnson et al. | 709/224 |
| 6,003,050 | A * | 12/1999 | Silver et al. | 715/536 |
| 6,204,782 | B1 * | 3/2001 | Gonzalez et al. | 341/90 |
| 6,356,866 | B1 * | 3/2002 | Pratley et al. | 704/9 |
| 6,359,572 | B1 * | 3/2002 | Vale | 341/23 |
| 2002/0146181 | A1 * | 10/2002 | Azam et al. | 382/309 |
| 2004/0172601 | A1 * | 9/2004 | Rettig et al. | 715/523 |

FOREIGN PATENT DOCUMENTS

| JP | 2000105662 A | 4/2000 |
|---|---|---|
| JP | 2002508559 | 3/2002 |
| JP | 2002196865 A | 7/2002 |

OTHER PUBLICATIONS

Hariharam, Cut and Paste Function on clipboard, Mar. 11, 1996, New Straits Times, proquest doc ID: 22655677, p. 40.*
Golding, ASCII Converter (A utility to convert ASCII characters to Hexadecimal and Unicode), Dec. 4, 2002, p. 1.*
JWPce Manual Basic Editing, Oct. 23, 1999, UCLA Physics Dep., pp. 1-11.*
Sourceforge, UMap A Unicode clipboard filler, Jan. 30, 2003, Sourceforge.net, pp. 1-4.*
Haible, "The Unicode HOWTO", XP-002289727, Jan. 23, 2001, ftp://ftp.ilog.fr/pub/Users/haible/utf8/Unicode-HOWTO.html, 30 pages.
Dirson, "The Linux Console Tools", XP-002289728, Dec. 9, 1999, http://1ct.sourceforge.net/1ct/t1.html, 2 pages.

* cited by examiner

*Primary Examiner* — Manglesh M Patel
(74) *Attorney, Agent, or Firm* — Yee & Associates, P.C.; David A. Mims, Jr.

(57) ABSTRACT

An apparatus and method for providing Unicode support in legacy operating systems are provided. With the apparatus and method, a focus hook module, keyboard hook module, and keystroke conversion module are registered with the legacy operating system. The focus hook module determines the currently active application and whether the currently active application is Unicode capable. The keyboard hook module receives keyboard events from an input interface and sends those keyboard events to the keystroke conversion module. The keystroke conversion module converts the keyboard events into Unicode characters which are sent back to the keyboard hook module. The keyboard hook module then stores the Unicode characters in a temporary storage memory, e.g., the clipboard. The keyboard hook module then sends a command to the application to paste the contents of the temporary storage memory to the currently active application.

17 Claims, 4 Drawing Sheets

ENABLING UNICODE INPUT IN LEGACY OPERATING SYSTEMS

BACKGROUND OF THE INVENTION

1. Technical Field

The present invention is directed to an apparatus and method for enabling Unicode input in legacy operating systems. More specifically, the present invention is directed to a mechanism that receives keystrokes that are to be converted via an input method editor which converts the keyboard strokes to a Unicode representation which may be used with applications that support Unicode even though the applications are executing in an operating system that does not have Unicode support or Unicode support for the particular selected script.

2. Description of Related Art

Modern operating systems, e.g., Windows 2000™ and Windows XP™ from Microsoft Corporation, enable full Unicode input via input method editors (IMEs). Unicode is a superset of the ASCII character set that uses two bytes for each character rather than one. As a result, the Unicode character set is able to handle 65,536 character combinations rather than ASCII's 256. This allows many of the world's languages to be represented in Unicode when they would otherwise not be able to be represented in the ASCII character set.

Input method editors (IMEs) are programs that allow computer users to enter complex characters and symbols, such as Japanese characters, using a standard keyboard. Examples of such IMEs include the IBM Indic IME, Microsoft Global IME 5.02 and Global IME for Office XP. The IME takes keyboard events and converts them to a Unicode representation which may be used with the operating system and/or applications running within the operating system environment.

In legacy operating systems, e.g., Microsoft Windows 95™, such IME frameworks either do not exist or the character sets are limited to a very few specific languages. Thus, for the most part legacy operating systems are not capable of making use of complex character sets, such as Indic scripts (e.g., Devanagari), Japanese scripts, and the like, because they are not capable of supporting the Unicode character set.

Therefore, it would be beneficial to have an apparatus and method for providing Unicode support in legacy operating systems. Moreover, it would be beneficial to have an apparatus and method that provides Unicode support without requiring modification of legacy operating systems, does not require modifications to applications running in the operating system environment, and does not require complex hardware.

SUMMARY OF THE INVENTION

The present invention provides an apparatus and method for providing Unicode support in legacy operating systems. With the apparatus and method of the present invention, a focus hook module, keyboard hook module, and keystroke conversion module are registered with the legacy operating system.

The focus hook module determines the currently active application and whether the currently active application is Unicode capable. The keyboard hook module receives keyboard events from an input interface and sends those keyboard events to the keystroke conversion module. The keystroke conversion module converts the keyboard events into Unicode characters which are sent back to the keyboard hook module.

The keyboard hook module then stores the Unicode characters in a temporary storage memory, e.g., the clipboard. The keyboard hook module then sends a command to the temporary storage memory to paste the contents of the temporary storage memory to the currently active application. In this way, the operating system is bypassed so that the operating system need not be equipped with an input method editor in order for Unicode to be used with a Unicode capable application.

These and other features and advantages will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
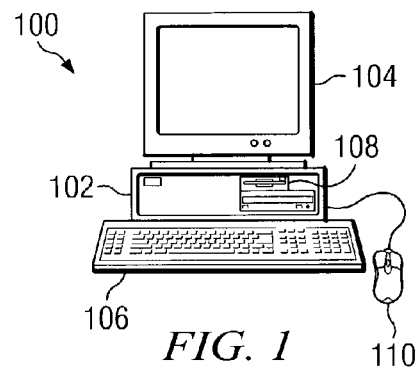
FIG. 1 is an exemplary diagram of a computing device in which the present invention may be implemented.
Figure 2:
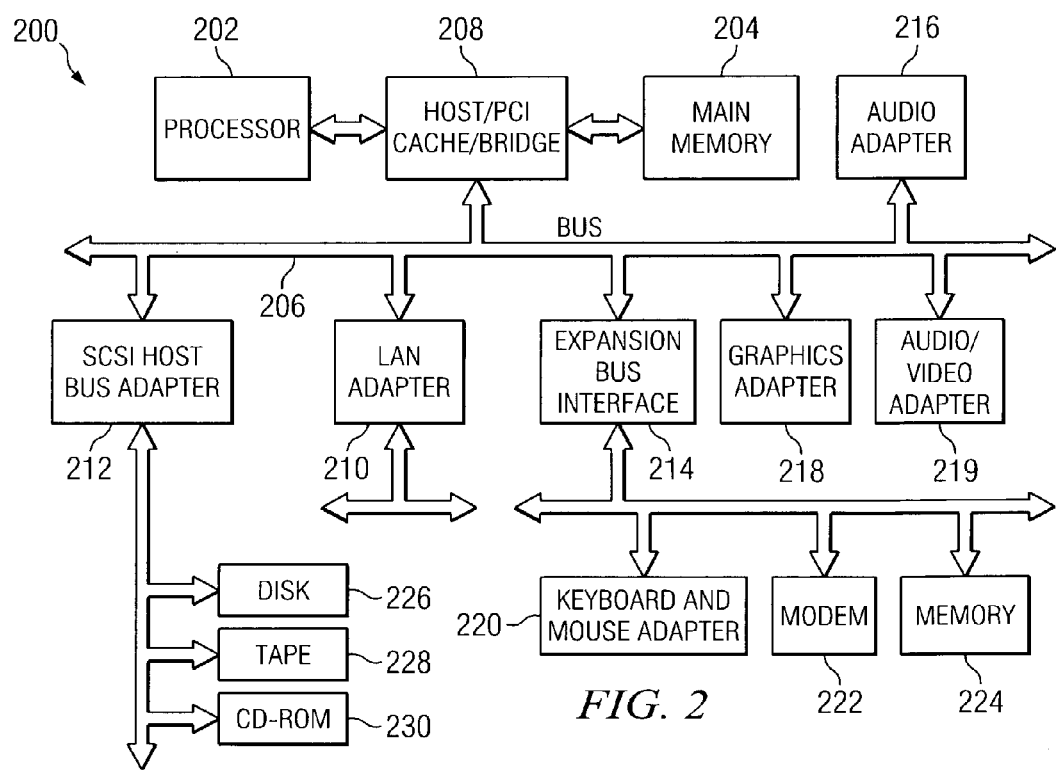
FIG. 2 is an exemplary block diagram of the primary operational components of a computing device in which the present invention may be implemented.

As mentioned above, the present invention provides an apparatus and method for providing Unicode support in legacy operating systems. The present invention may be implemented in any computing device in which an operating system is present. Such computing devices include, but are not limited to, stand-alone personal computers, personal digital assistants (PDAs), server computing devices, computerized mobile telephones, laptop computers, palmtop computers, and the like. FIGS. 1 and 2 are intended to provide a background illustration of a typical computing device in which the present invention may be implemented and are not intended to imply any limitation as to the type of device in which the apparatus and method of the present invention may be implemented.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y.

Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used.

Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

The operating system of the computing device depicted in FIGS. 1 and 2, in a preferred embodiment of the present invention, is a legacy operating system in which Unicode capability is not present. Examples of such legacy operating systems include, for example, Microsoft Windows 95™ and Windows 98™. In other embodiments, the operating system of the computing device is one with limited Unicode capability in that only selected language character sets are supported by the operating system and the present invention may be used to provide additional Unicode support for other language character sets not specifically supported by the operating system. Examples of such operating systems in which limited Unicode support is provided include Microsoft Windows 2000™ and Windows XP™.

With the present invention, a user of a computing device in which a legacy operating system is present, or in which an operating system having limited Unicode support is present, may make use of Unicode with Unicode capable applications despite the limitations of the operating system. That is, the present invention provides an input method editor for legacy operating systems, and limited support operating systems, such that the user may select the type of language character set that is to be used from a plurality of Unicode based character sets regardless of whether the operating system supports that character set or not.

Figure 3:
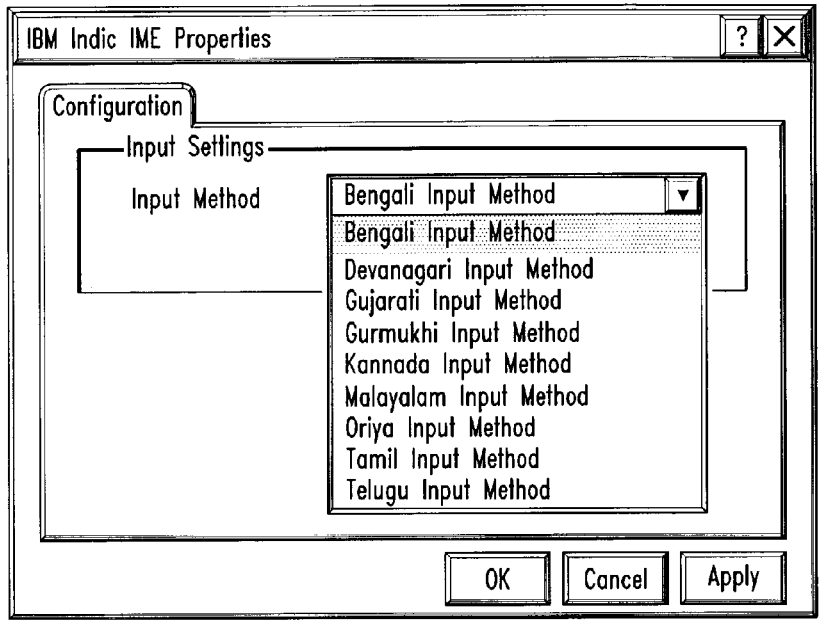
FIG. 3 is an exemplary diagram illustrating a configuration graphical user interface for an input method editor according to an exemplary embodiment of the present invention.

With the apparatus and method of the present invention, the user may invoke a configuration interface, such as that shown in FIG. 3, to select a character set for use with applications in the operating system environment. The present invention provides a "bypass" of the operating system by using a keyboard hook module, a focus hook module, a keystroke conversion module, and a temporary storage memory (e.g., a clipboard) that together operate to paste in Unicode representations of keystrokes to Unicode enabled applications despite the limitations of the operating system.

Figure 4:
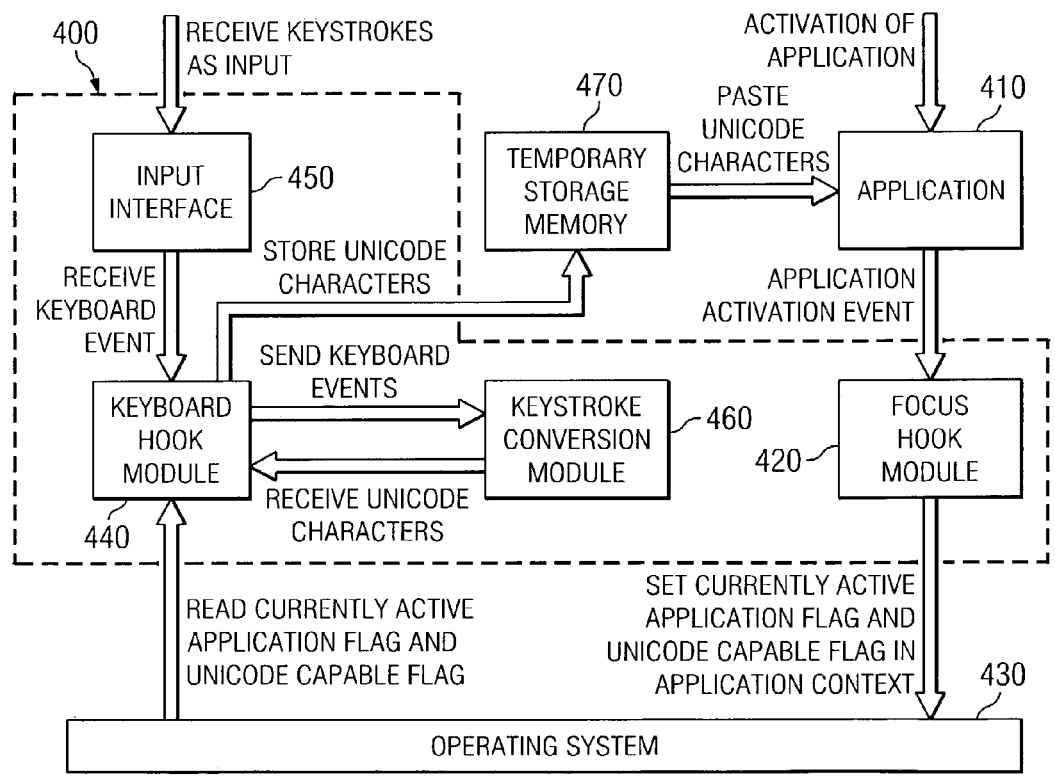
FIG. 4 is an exemplary block diagram of a input method editor for a legacy operating system in accordance with the present invention.

With reference now to FIG. 4, as illustrated an input method editor 400 is provided for legacy and limited Unicode support operating systems, such as operating system 430. The input method editor 400 includes a focus hook module 420, a keyboard hook module 440, a keystroke conversion module 460, and an input interface 450.

With the present invention, the keyboard hook module 440 and focus hook module 420 are registered with the operating system 430 of the computing device. The focus hook module 420 continually monitors for application activation events. When there is a selection of an application by the user, e.g., activation of an application, either by initiating running of the application, switching to make the application window active within the operating system environment, or the like, the focus hook module 420 receives an application activation event. While FIG. 4 illustrates the application activation event being received from the application 410 to illustrate the application 410 being a "focus" of the operating system environment, the focus hook module 420 may, in actuality, receive the application activation event from the operating system 430.

In response to the application activation event, the focus hook module 420 determines the currently active application and whether that application is capable of using Unicode character sets. The determination of the currently active application may be made based on information contained in the application activation event. For example, the name of the application, application class, other type of application identifier, or the like, that is the source of the application activation event may be contained within the application activation event and may be used to identify the currently active application.

The focus hook module 420 may determine whether the application has Unicode capability by comparing the name of the application, class name, or other type of application identifier to a list of Unicode capable application identifiers maintained either by the focus hook module 420 or accessible by the focus hook module 420. For example, a list of Unicode capable application identifiers may be maintained in a file stored in the computing system and that file may be accessed by the focus hook module 420 to determine if the currently active application is Unicode capable. Alternatively, the list of Unicode capable application identifiers may be hardcoded into the focus hook module 420.

Based on these determinations, the focus hook module 420 sets flags in the application context of the operating system 430 indicating that the application is currently active and that the application is Unicode capable. These flags are then used by the keyboard hook module 440 to determine whether to send keyboard events to the keystroke conversion module 460 and to what application to paste Unicode representations.

The keyboard hook module 440 receives keyboard events from an input interface 450 of the IME 400 in response to a user inputting keystrokes, such as via a keyboard attached to the computing device. The keyboard hook module 440 reads the currently active application flag and Unicode capability flag for the currently active application to determine if the application 410 is capable of receiving Unicode input. If not, the operation terminates with the keyboard events being processed in a normal manner as if the IME 400 were not present. If the application 410 is capable of receiving Unicode input, the keyboard hook module 440 forwards the keyboard events to the keystroke conversion module 460.

In addition, the input interface 450 may provide a configuration graphical user interface, such as that shown in FIG. 3, to allow a user to select the character set that the user wishes to make use of with applications. The character sets provided may include character sets that require the use of Unicode to present those character sets in application input fields, e.g., Chinese character sets, Japanese character sets, Inic character sets, and the like.

The keystroke conversion module 460 takes the keyboard events that are received and converts the keystrokes associated with those events into a Unicode representation of the keystrokes. This conversion may be performed based on the particular character set selected by the user via the input interface 450. Thus, the keystroke conversion module 460 performs a similar operation as that known in existing input method editors with regard to converting keystrokes to complex characters identified in a Unicode representation. In this way, the keystrokes made by the user may be converted to a Asian, Indic, or other complex character set. Asian character sets, as the term is used herein, refers to the languages and scripts used in Asian countries including Japan, China, Vietnam, Laos, and the like. Indic character sets, as the term is used herein refers to the languages and scripts used in the Indian subcontinent. I The Unicode representation of the keystrokes entered by the user are then returned to the keyboard hook module 440. The keyboard hook module 440 stores the Unicode representation in a temporary storage memory 470. This temporary storage memory 470, in a preferred embodiment, is a clipboard.

The clipboard is a reserved section of memory that is used as a temporary holding area for data that is copied or moved from one application to another using the "copy and paste" and "cut and paste" operations. Each time something is transferred to the clipboard, the previous contents of the clipboard are deleted. The clipboard serves as a behind-the-scenes function, holding its contents for pasting into another application.

After storing the Unicode representation into the temporary storage memory 470, the keyboard hook module 440 sends a command to the focused application to paste the contents of the temporary storage memory 470 to the currently active application 410, as identified by the currently active application flag. The contents of the temporary storage memory 470 are then pasted into the application 410 at the position of the cursor in an input field of the application 410. In this way, the Unicode representation stored in the temporary storage memory 470, which was generated by the keystroke conversion module 460 in response to keyboard events received by the keyboard hook module 440, are input to the application 410 even though the operating system 430 either does not support Unicode or has limited support of Unicode such that the particular character set selected by the user is not specifically supported by the operating system 430.

Figure 5:
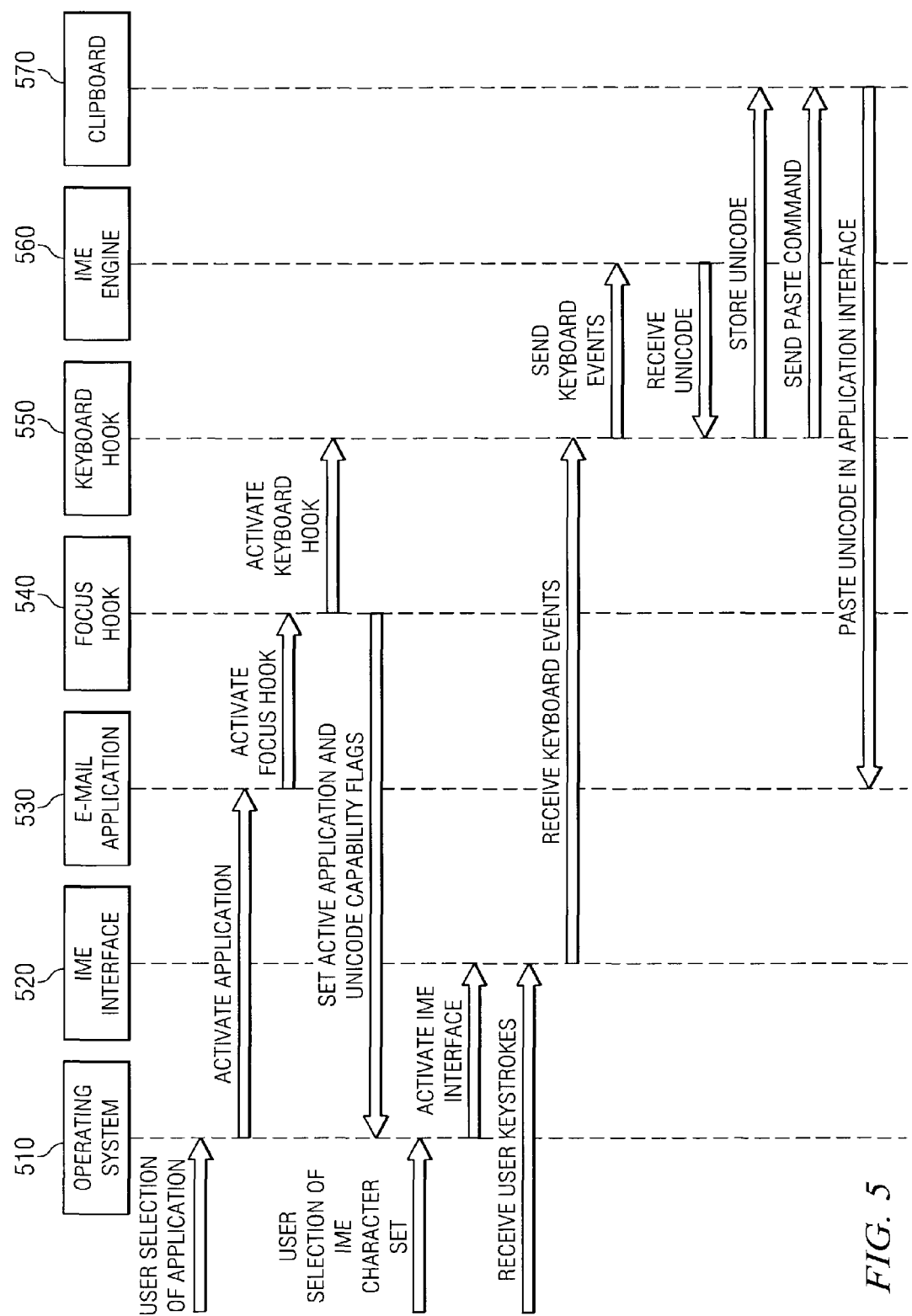
FIG. 5 is a message flow diagram illustrating the interaction of the primary components of the present invention when applied to an electronic mail application.

FIG. 5 is a message flow diagram illustrating the interaction of the primary components of the present invention when applied to an electronic mail application. The present invention may be utilized with any application in which text input from a user is received in one or more input fields of the application. As an example, FIG. 5 makes reference to an electronic mail application, such as Lotus Notes™ from International Business Machines, Inc. or Microsoft Outlook™ and uses the clipboard to temporarily store Unicode representations of text input for pasting to the electronic mail application.

As shown in FIG. 5, the operating system 510 receives a user selection of an application as a currently active application. This selection may be, for example, the loading and running of the application, such as in response to a "double click" of an icon representing the application on a desktop, the selection of an already loaded and running application from a tool bar or an open window in the desktop, or the like. In the depicted example, the selected application is the electronic mail application 530 which is activated in response to the user's selection.

In response to the activation of the application, the focus hook module 540 is activated such that the focus hook module 540 identifies the electronic mail application 530 as the currently active application and determines whether the electronic mail application 530 is capable of using Unicode. If the focus hook module 540 determines that the electronic mail application 530 is capable of using Unicode, the focus hook module 540 sends a message to the keyboard hook module 550 thereby activating the keyboard hook module 550 to listen for keyboard events. The focus hook module 540 then sets the active application and Unicode capability flags in the application context of the operating system 510.

At sometime later, or prior to the above process, the user may select a character set for use with the electronic mail application 530. This character set may be a complex character set that is only obtainable using Unicode via the IME of the present invention, for example. The IME interface 520 is activated and receives user keystrokes from a keyboard associated with the computing device.

The received keystrokes are used to generate keyboard events that are forwarded to the keyboard hook module 550. Since the electronic mail application 530 has been determined to support Unicode (based on the flags set by the focus hook module 540, for example), the keyboard hook module 550 sends the keyboard events to the IME engine 560. The IME engine 560 converts the keyboard events into a Unicode representation and sends the Unicode representation back to the keyboard hook module 550.

The keyboard hook module 550 stores the Unicode representation in the clipboard 570 momentarily in order to be able to paste the Unicode into the input field of the electronic mail application 530. Thereafter, the keyboard hook 550 sends a paste command to the electronic mail application 530. The clipboard 570 then pastes the Unicode representation stored in the clipboard 570 into the application interface of the electronic mail application 530, i.e. the input field where the cursor currently resides. In this way, the application receives Unicode input even though the operating system does not support Unicode and may convert the Unicode into the appropriate character representation on the display screen in the application window. Thus, a user may type an electronic mail message on a standard keyboard coupled to a computing device that has a legacy operating system that does not support Unicode, and be able to see the electronic mail message represented on the display screen in the complex character set selected by the user.

Figure 6:
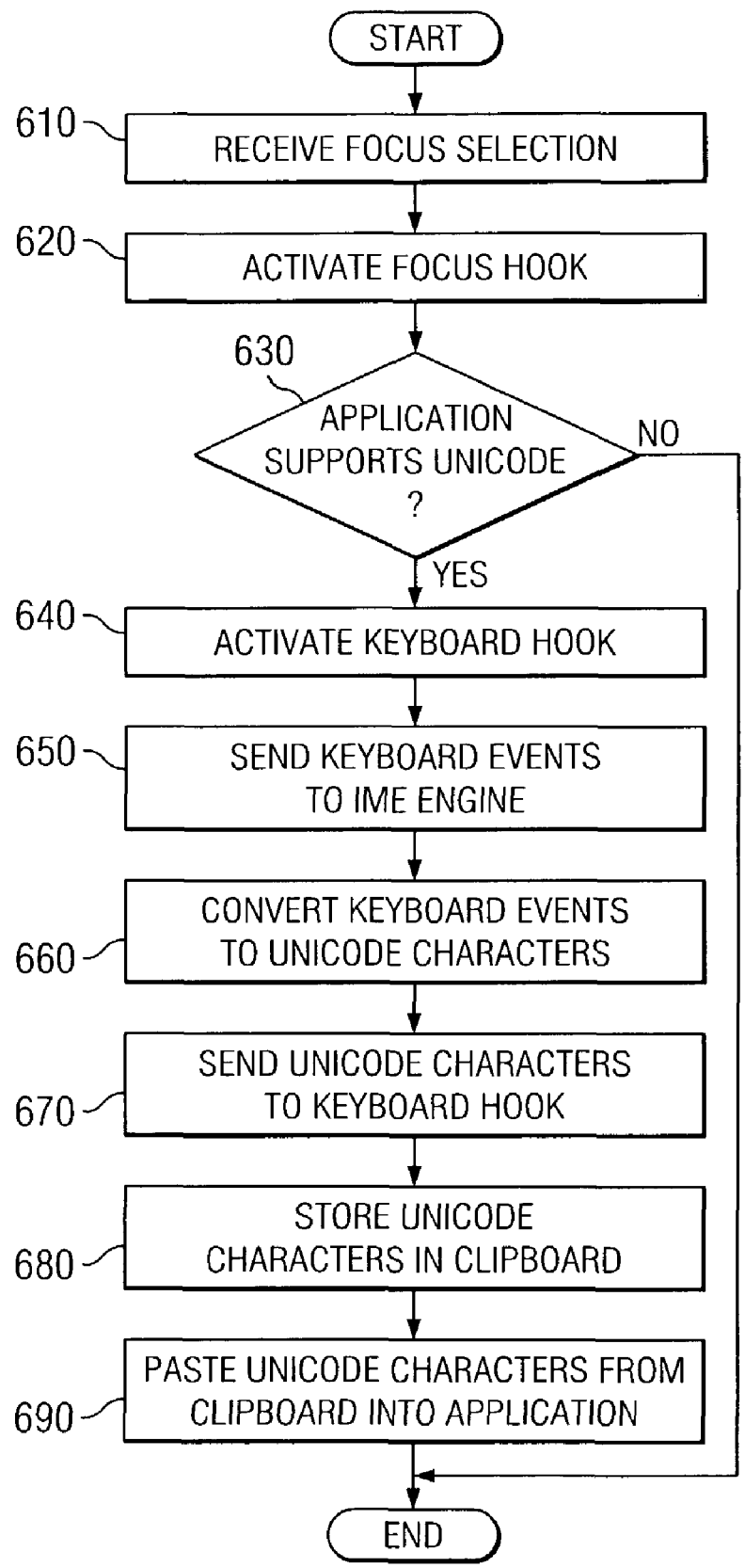
FIG. 6 is a flowchart outlining an exemplary operation of the present invention.

FIG. 6 is a flowchart outlining an exemplary operation of the present invention. As shown in FIG. 6, the operation starts by receiving a focus selection (step 610). The term "focus" is meant to indicate the selection of a currently active application as the application with which the user is currently interfacing.

The focus hook module is then activated (step 620) and a determination is made as to whether the application supports Unicode (step 630). If not, the operation terminates. Otherwise, the keyboard hook module is activated (step 640) which receives keystroke input and generates keyboard events for conversion to a Unicode representation.

The keyboard events generated by the keyboard hook module in response to received keystrokes are sent to the IME engine (step 650). The IME engine converts these keyboard events into Unicode characters, i.e. a Unicode representation of the keyboard events (step 660). The Unicode characters are sent back to the keyboard hook module (step 670) which stores them in a temporary storage memory, such as a clipboard (step 680). The keyboard hook module then sends a paste command to the application causing the Unicode characters stored therein to be pasted to the cursor position in an input field of the application (step 690) and the operation terminates.

Thus, with the present invention, Unicode input may be received in a computing device whose operating system does not support Unicode. In this way, Unicode enabled applications may be used with legacy operating systems with full Unicode capability. With the present invention, a user may interface with Unicode enabled applications in his/her own language complex character set even though the operating system may not support Unicode or may not support the user's specific language complex character set.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of inputting text to a program, comprising:
receiving keystroke input from a keyboard;
converting the keystroke input to a Unicode representation of the keystroke input;
storing the Unicode representation of the keystroke input in a temporary storage memory;
pasting the Unicode representation of the keystroke input from the temporary storage memory into the program;
utilizing a focus hook module registered with an operating system to identify a currently active program;
comparing an identifier of the currently active program with a list of program identifiers for programs that have Unicode capability;
determining that the currently active program has Unicode capability if the identifier of the currently active program is present in the list of program identifiers; and
setting one or more flags in a program context of an operating system environment based on identification of the currently active program and determining if the currently active program has Unicode capability.

2. The method of claim 1, further comprising:
receiving a character set selection to generate a selected character set, wherein converting the keystroke input to the Unicode representation of the keystroke input includes converting the keystroke input to the Unicode representation in the selected character set.

3. The method of claim 2, wherein the selected character set is chosen from a group consisting of an Asian language character set and an Indic character set.

4. The method of claim 1, wherein the operating system environment does not support Unicode.

5. The method of claim 2, wherein an operating system environment supports Unicode but does not support the selected character set.

6. The method of claim 1, wherein the temporary storage memory is a clipboard memory.

7. The method of claim 1, wherein pasting the Unicode representation of the keystroke input from the temporary storage memory into the program includes sending a command to the program instructing the program to paste the Unicode representation of the keystroke input from the temporary storage memory into the program at a current cursor location.

8. The method of claim 1, wherein the step of comparing the identifier of the currently active program with the list of program identifiers for programs that have Unicode capability and the step of determining that the currently active program has Unicode capability if the identifier of the currently active program is present in the list of program identifiers are performed by the focus hook module, and wherein the list of program identifiers is hard-coded into the focus hook module.

9. The method of claim 1, wherein the step of comparing the identifier of the currently active program with the list of program identifiers for programs that have Unicode capability and the step of determining that the currently active program has Unicode capability if the identifier of the currently active program is present in the list of program identifiers are performed by the focus hook module, and wherein the list of program identifiers is stored in a data file accessible by the focus hook module.

10. The method of claim 1, wherein the program is an electronic mail program.

11. The method of claim 1, further comprising:
identifying a currently active program;
determining if the currently active program has Unicode capability; and
sending a message to an operating system indicating results of identifying the currently active program and of determining if the currently active program has Unicode capability.

12. The method of claim 1, wherein the currently active program is identified based on an activation event generated when the program is selected by a user.

13. A method of inputting text to a program, comprising:
receiving keystroke input from a keyboard;
converting the keystroke input to a Unicode representation of the keystroke input;
storing the Unicode representation of the keystroke input in a temporary storage memory; pasting the Unicode representation of the keystroke input from the temporary storage memory into the program;
utilizing a focus hook module registered with an operating system to identify a currently active program;
comparing an identifier of the currently active program with a list of program identifiers for programs that have Unicode capability;
determining that the currently active program has Unicode capability if the identifier of the currently active program is present in the list of program identifiers;
setting one or more flags in a program context of an operating system environment based on identification of the currently active program and determining if the currently active program has Unicode capability; and
registering a keyboard hook module with the operating system that runs the program, wherein the keystroke input from the keyboard is received in the keyboard hook module.

14. A computer system, comprising:
one or more processors, one or more computer readable memories, and one or more computer readable tangible storage devices;
a keyboard connected to at least one of the one or more processors;
program instructions stored in at least one of the one or more computer readable, tangible storage devices for execution by at least one of the one or more processors via at least one of the one or more computer readable memories for receiving keystroke input from the keyboard;
program instructions stored in at least one of the one or more computer readable, tangible storage devices for execution by at least one of the one or more processors via at least one of the one or more computer readable memories for converting the keystroke input to a Unicode representation of the keystroke input;
program instructions stored in at least one of the one or more computer readable, tangible storage devices for execution by at least one of the one or more processors via at least one of the one or more computer readable memories for storing the Unicode representation of the keystroke input in a temporary storage memory;
program instructions stored in at least one of the one or more computer readable, tangible storage devices for execution by at least one of the one or more processors via at least one of the one or more computer readable memories for pasting the Unicode representation of the keystroke input from the temporary storage memory into the program;
program instructions stored in at least one of the one or more computer readable, tangible storage devices for execution by at least one of the one or more processors via at least one of the one or more computer readable memories for utilizing a focus hook module registered with an operating system to identify a currently active program;
program instructions stored in at least one of the one or more computer readable, tangible storage devices for execution by at least one of the one or more processors via at least one of the one or more computer readable memories for comparing an identifier of the currently active program with a list of program identifiers for programs that have Unicode capability;
program instructions stored in at least one of the one or more computer readable, tangible storage devices for execution by at least one of the one or more processors via at least one of the one or more computer readable memories for determining that the currently active program has Unicode capability if the identifier of the currently active program is present in the list of program identifiers; and
program instructions stored in at least one of the one or more computer readable, tangible storage devices for execution by at least one of the one or more processors via at least one of the one or more computer readable memories for setting one or more flags in a program context of an operating system environment based on identification of the currently active program and determining if the currently active program has Unicode capability.

15. A computer system, comprising:
one or more processors, one or more computer readable memories, and one or more computer readable tangible storage devices;

a keyboard connected to at least one of the one or more processors;

program instructions stored in at least one of the one or more computer readable, tangible storage devices for execution by at least one of the one or more processors via at least one of the one or more computer readable memories for receiving keystroke input from the keyboard;

program instructions stored in at least one of the one or more computer readable, tangible storage devices for execution by at least one of the one or more processors via at least one of the one or more computer readable memories for converting the keystroke input to a Unicode representation of the keystroke input;

program instructions stored in at least one of the one or more computer readable, tangible storage devices for execution by at least one of the one or more processors via at least one of the one or more computer readable memories for storing the Unicode representation of the keystroke input in a temporary storage memory;

program instructions stored in at least one of the one or more computer readable, tangible storage devices for execution by at least one of the one or more processors via at least one of the one or more computer readable memories for pasting the Unicode representation of the keystroke input from the temporary storage memory into the program;

program instructions stored in at least one of the one or more computer readable, tangible storage devices for execution by at least one of the one or more processors via at least one of the one or more computer readable memories for utilizing a focus hook module registered with an operating system to identify a currently active program;

program instructions stored in at least one of the one or more computer readable, tangible storage devices for execution by at least one of the one or more processors via at least one of the one or more computer readable memories for comparing an identifier of the currently active program with a list of program identifiers for programs that have Unicode capability;

program instructions stored in at least one of the one or more computer readable, tangible storage devices for execution by at least one of the one or more processors via at least one of the one or more computer readable memories for determining that the currently active program has Unicode capability if the identifier of the currently active program is present in the list of program identifiers;

setting one or more flags in a program context of an operating system environment based on identification of the currently active program and determining if the currently active program has Unicode capability; and program instructions stored in at least one of the one or more computer readable, tangible storage devices for execution by at least one of the one or more processors via at least one of the one or more computer readable memories for registering a keyboard hook module with the operating system that runs the program, wherein the keystroke input from the keyboard is received in the keyboard hook module.

16. A computer program product, comprising:

one or more computer readable tangible storage devices;

program instructions stored in at least one of the one or more computer readable, tangible storage devices for receiving keystroke input from a keyboard;

program instructions stored in at least one of the one or more computer readable, tangible storage devices for converting the keystroke input to a Unicode representation of the keystroke input;

program instructions stored in at least one of the one or more computer readable, tangible storage devices for storing the Unicode representation of the keystroke input in a temporary storage memory; and program instructions stored in at least one of the one or more computer readable, tangible storage devices for pasting the Unicode representation of the keystroke input from the temporary storage memory into the program;

program instructions stored in at least one of the one or more computer readable, tangible storage devices for utilizing a focus hook module registered with an operating system to identify a currently active program;

program instructions stored in at least one of the one or more computer readable, tangible storage devices for comparing an identifier of the currently active program with a list of program identifiers for programs that have Unicode capability;

program instructions stored in at least one of the one or more computer readable, tangible storage devices for determining that the currently active program has Unicode capability if the identifier of the currently active program is present in the list of program identifiers; and program instructions stored in at least one of the one or more computer readable, tangible storage devices for setting one or more flags in a program context of an operating system environment based on identification of the currently active program and determining if the currently active program has Unicode capability.

17. A computer program product, comprising:

one or more computer readable tangible storage devices;

program instructions stored in at least one of the one or more computer readable, tangible storage devices for receiving keystroke input from a keyboard;

program instructions stored in at least one of the one or more computer readable, tangible storage devices for converting the keystroke input to a Unicode representation of the keystroke input;

program instructions stored in at least one of the one or more computer readable, tangible storage devices for storing the Unicode representation of the keystroke input in a temporary storage memory;

program instructions stored in at least one of the one or more computer readable, tangible storage devices for pasting the Unicode representation of the keystroke input from the temporary storage memory into the program;

program instructions stored in at least one of the one or more computer readable, tangible storage devices for utilizing a focus hook module registered with an operating system to identify a currently active program;

program instructions stored in at least one of the one or more computer readable, tangible storage devices for comparing an identifier of the currently active program with a list of program identifiers for programs that have Unicode capability;

program instructions stored in at least one of the one or more computer readable, tangible storage devices for determining that the currently active program has Unicode capability if the identifier of the currently active program is present in the list of program identifiers;

setting one or more flags in a program context of an operating system environment based on identification of the currently active program and determining if the currently active program has Unicode capability; and program instructions stored in at least one of the one or more computer readable, tangible storage devices for registering a keyboard hook module with the operating system that runs the program, wherein the keystroke input from the keyboard is received in the keyboard hook module.

* * * * *